US012651207B2

(12) United States Patent
Zheng

(10) Patent No.: US 12,651,207 B2
(45) Date of Patent: Jun. 9, 2026

(54) REAL-TIME PRODUCTION THROUGHPUT PREDICTION WITH MACHINE LEARNING

(71) Applicant: Hitachi, Ltd., Tokyo (JP)

(72) Inventor: Lili Zheng, Novi, MI (US)

(73) Assignee: Hitachi, Ltd., Tokyo (JP)

( * ) Notice: Subject to any disclaimer, the term of this patent is extended or adjusted under 35 U.S.C. 154(b) by 717 days.

(21) Appl. No.: 17/979,645

(22) Filed: Nov. 2, 2022

(65) Prior Publication Data

US 2024/0144108 A1     May 2, 2024

(51) Int. Cl.
*G06N 20/20*          (2019.01)

(52) U.S. Cl.
CPC .................................... *G06N 20/20* (2019.01)

(58) Field of Classification Search
CPC ........... G06N 20/00; G06N 20/20; G06N 5/01
See application file for complete search history.

(56) References Cited

U.S. PATENT DOCUMENTS

| | | | |
|---|---|---|---|
| 11,205,235 B2 | 12/2021 | Sun et al. | |
| 2013/0131840 A1* | 5/2013 | Govindaraj | G05B 19/41845 |
| | | | 700/19 |
| 2017/0052518 A1* | 2/2017 | Wang | G05B 19/4183 |
| 2019/0205885 A1* | 7/2019 | Lim | H04L 63/1425 |
| 2022/0092617 A1* | 3/2022 | Burton | G06Q 30/0202 |
| 2022/0203637 A1* | 6/2022 | Knapp | B29D 30/0061 |
| 2025/0067164 A1* | 2/2025 | Gupta | E21B 44/00 |

* cited by examiner

*Primary Examiner* — Jay A Morrison
(74) *Attorney, Agent, or Firm* — PROCOPIO, CORY, HARGREAVES & SAVITCH LLP

(57) ABSTRACT

In example implementations described herein, systems and methods are presented for predicting a throughput for a production line which can involve collecting a current set of production line data associated with a production line; and computing a predicted production throughput for the production line over a production period based on a boosted gradient decision tree algorithm applied to the current set of production line data, wherein the boosted gradient decision tree algorithm is trained on historical production line data.

20 Claims, 8 Drawing Sheets

202 — Calculate the average of the production per shift

↓

204 — Calculate the residuals

↓

206 — Construct a decision tree ensemble

↓

208 — Predict the average production per shift using all of the trees within the ensemble

↓

210 — Compute the new residuals

↓

212 — Termination condition reached?

↓

214 — Use ensemble of decision trees to make a prediction 602  collect a current set of production line data associated with a production line 604  compute a predicted production throughput for the production line over a production period based on a boosted gradient decision tree algorithm applied to the current set of production line data

600

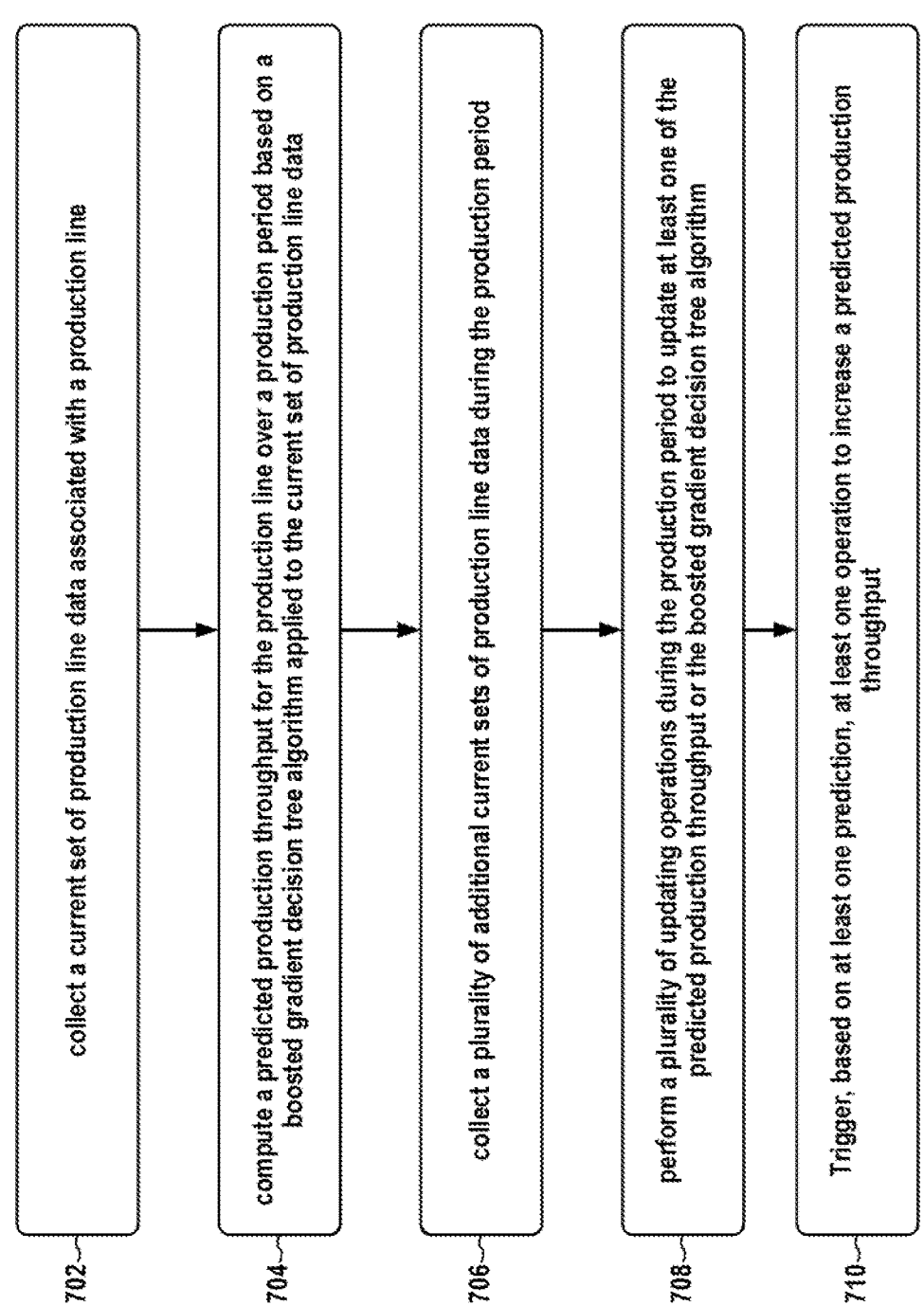

702 — collect a current set of production line data associated with a production line 704 — compute a predicted production throughput for the production line over a production period based on a boosted gradient decision tree algorithm applied to the current set of production line data 706 — collect a plurality of additional current sets of production line data during the production period 708 — perform a plurality of updating operations during the production period to update at least one of the predicted production throughput or the boosted gradient decision tree algorithm 710 — Trigger, based on at least one prediction, at least one operation to increase a predicted production throughput

REAL-TIME PRODUCTION THROUGHPUT PREDICTION WITH MACHINE LEARNING

BACKGROUND

Field

The present disclosure is generally directed to production scheduling and/or throughput prediction.

Related Art

In production, before each shift, there is often a plan or expectation for an amount of parts made over a production shift based on normal experiences. However, the plan or expectation may not be accurate and may not reflect unexpected alarms, downtimes, or other circumstances. Currently available methods for determining an expected amount of parts to be made over a production shift may fail to provide accurate estimates and/or predictions based on non-optimized prediction algorithms and/or based on changes in conditions that are not accounted for in the prediction algorithms. For example, current methods may be based on simple calculations, such as how many machines are working, the normal processing time for each part, and other obvious factors. While available production throughput prediction approaches use some mathematical prediction models, the simplicity of the models may be unsuitable for real-world applications.

Accordingly, presented herein is a method and apparatus for improving prediction accuracy for expected amounts of parts produced over a shift and associated planning. The improvement may be achieved by utilizing the large amounts of data produced in a modern production line (or other industrial setting) and one or more of machine learning (ML), deep learning, or artificial intelligence (AI) to train networks or algorithms based on the available data.

SUMMARY

Example implementations described herein involve an innovative method and apparatus to achieve improved production flow prediction performance for a production line and/or other industrial environment. In some aspects, one or more of non-parametric methods and/or ML/DL/AI methods may be utilized to provide achieve the improved production flow prediction performance. The method and apparatus may use less prior knowledge about the relationship among different production flow patterns, less restriction on prediction tasks, and may better fit non-linear features in production data. While there are several sub-classes of ML methods (e.g., a regression model, or other ML methods) an appropriate type of ML method or model may be selected for building the prediction method or apparatus.

Aspects of the present disclosure include a method for production flow prediction, which can involve collecting a current set of production line data associated with a production line; and computing a predicted production throughput for the production line over a production period based on a boosted gradient decision tree algorithm applied to the current set of production line data, wherein the boosted gradient decision tree algorithm is trained on historical production line data.

Aspects of the present disclosure include a non-transitory computer readable medium, storing instructions for execution by a processor, which can involve instructions for collecting a current set of production line data associated with a production line; and computing a predicted production throughput for the production line over a production period based on a boosted gradient decision tree algorithm applied to the current set of production line data, wherein the boosted gradient decision tree algorithm is trained on historical production line data.

Aspects of the present disclosure include a system, which can involve means for collecting a current set of production line data associated with a production line; and computing a predicted production throughput for the production line over a production period based on a boosted gradient decision tree algorithm applied to the current set of production line data, wherein the boosted gradient decision tree algorithm is trained on historical production line data.

Aspects of the present disclosure include an apparatus, which can involve a processor, configured to collect a current set of production line data associated with a production line; and compute a predicted production throughput for the production line over a production period based on a boosted gradient decision tree algorithm applied to the current set of production line data, wherein the boosted gradient decision tree algorithm is trained on historical production line data.

BRIEF DESCRIPTION OF DRAWINGS

FIG. 7 is a flow diagram illustrating a method in accordance with some aspects of the disclosure.

DETAILED DESCRIPTION

Figure 1:
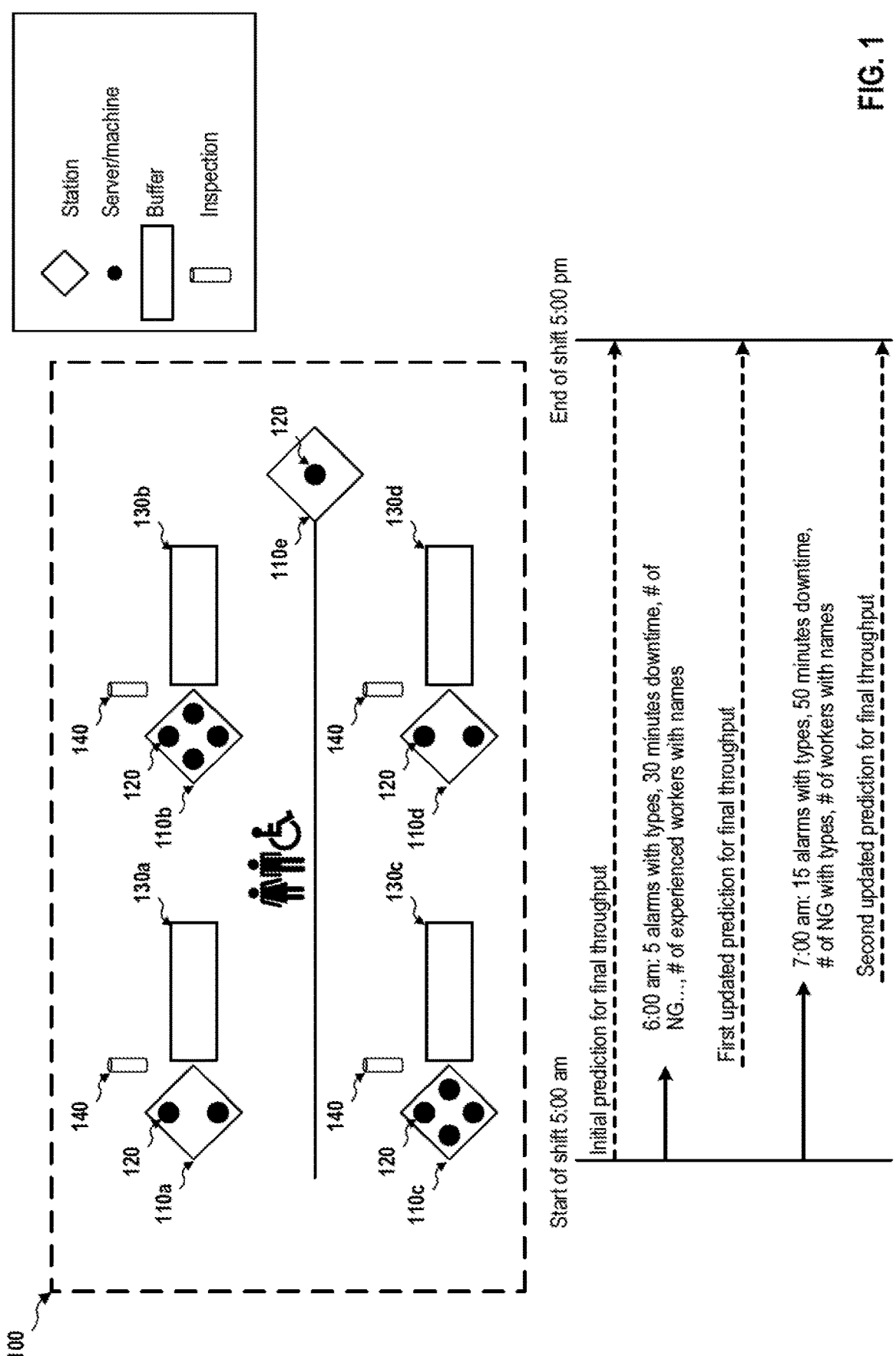
FIG. 1 is a diagram illustrating elements of a production line in accordance with some aspects of the disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve an innovative method to provide production flow prediction for a production line and/or other industrial environment. In some aspects, a ML, DL, and/or AI system architecture design method is provided to predict the overall throughput by the end of the shift in production line. As part of modern industry (e.g., "industry 4.0" or smart manufacturing), real-time monitoring has been applied broadly for production lines. However, the ML, DL, and/or AI related development is still restricted to certain areas, such as image analysis and traffic predictions. In some aspects of the disclosure, a gradient boost decision tree model is trained based on inspection data, e.g., the many types of data that are collected from the many components and/or sensors associated with a production line, to predict the total throughput of the production line by the end of each shift. In addition, the model, in some aspects, may be retrained or adjusted many times, e.g., iteratively, in order to consider a current state of the production line to produce a more accurate prediction. Accordingly, in some aspects, results will be more accurate as the end of the shift approaches.

For the purposes of this disclosure, a production line is understood to be a manufacturing and/or assembly process where materials are sequentially processed to make a product at the end. During the manufacturing and/or assembly process, raw materials may go through a series of working stations and transitional stages to produce a final product. For an assembly production line, in some aspects, components from other production lines are assembled to build a complex product. Assembly production lines may exist, e.g., in car manufacturing and complex equipment manufacturing. Production lines may be classified into job-shop, batch, repetitive, continuous, and mass production categories. In general, four production line characteristics may be defined to classify the production lines: (1) production volume, (2) working station arrangement, (3) buffer, and (4) process type.

FIG. 1 is a diagram 100 illustrating elements of a production line in accordance with some aspects of the disclosure. The production line, in some aspects, may have three principal components (1) working stations, (2) machines and/or servers, and (3) buffers. For example, the production line in diagram 100 may include working station 110a, working station 110b, working station 110c, working station 110d, and working station 110e. Each working station, in some aspects, may be associated with a buffer, e.g., buffer 130a, buffer 130b, buffer 130c, or buffer 130d, for transporting the product of the working station to, or storing the product for, a next working station. In some aspects, one or more working stations may not be associated with a buffer. The working stations may each be associated with a task and, in some aspects, may include, or be associated with, one or more machines and/or servers 120 performing the task of the working station. In some aspects, a working station may be associated with a corresponding inspection unit and/or process 140. Different subsystems may be identified or defined for performing the production prediction, e.g., in some aspects two adjacent working stations and a buffer connecting them may define a subsystem. Accordingly, each component (e.g., working station, machine and/or server, or buffer) may be part of multiple subsystems that may be useful for performing the production prediction.

Several metrics may be used to assess the quality of production lines. Among these, the Overall Equipment Effectiveness (OEE) is widely used as a method to evaluate the effectiveness of the equipment, and it consists of three indexes: Availability, Performance, and Quality. Availability refers to the percentage of machinery downtime; Performance describes the percentage of the maximum operational speed; Quality refers to the percentage of a good product (e.g., the percentage of products that pass inspection, are OK as opposed to no good (NG)). The level of these three indexes links to other machinery's operational characteristics such as energy consumption, waste generation, and yield. For instance, the yield of a production line is determined by the machine running speed, percentage of machine uptime as well as the final product pass rate. Similarly, a production line with low performance and low product pass rate tend to have low energy efficiency and high waste generation. In summary, Availability, Performance, and Quality are three fundamental indexes describing the performance of a production line.

Figure 2:
FIG. 2 is a flowchart illustrating the training and use of gradient boost decision trees in accordance with some aspects of the disclosure.
Figure 3:
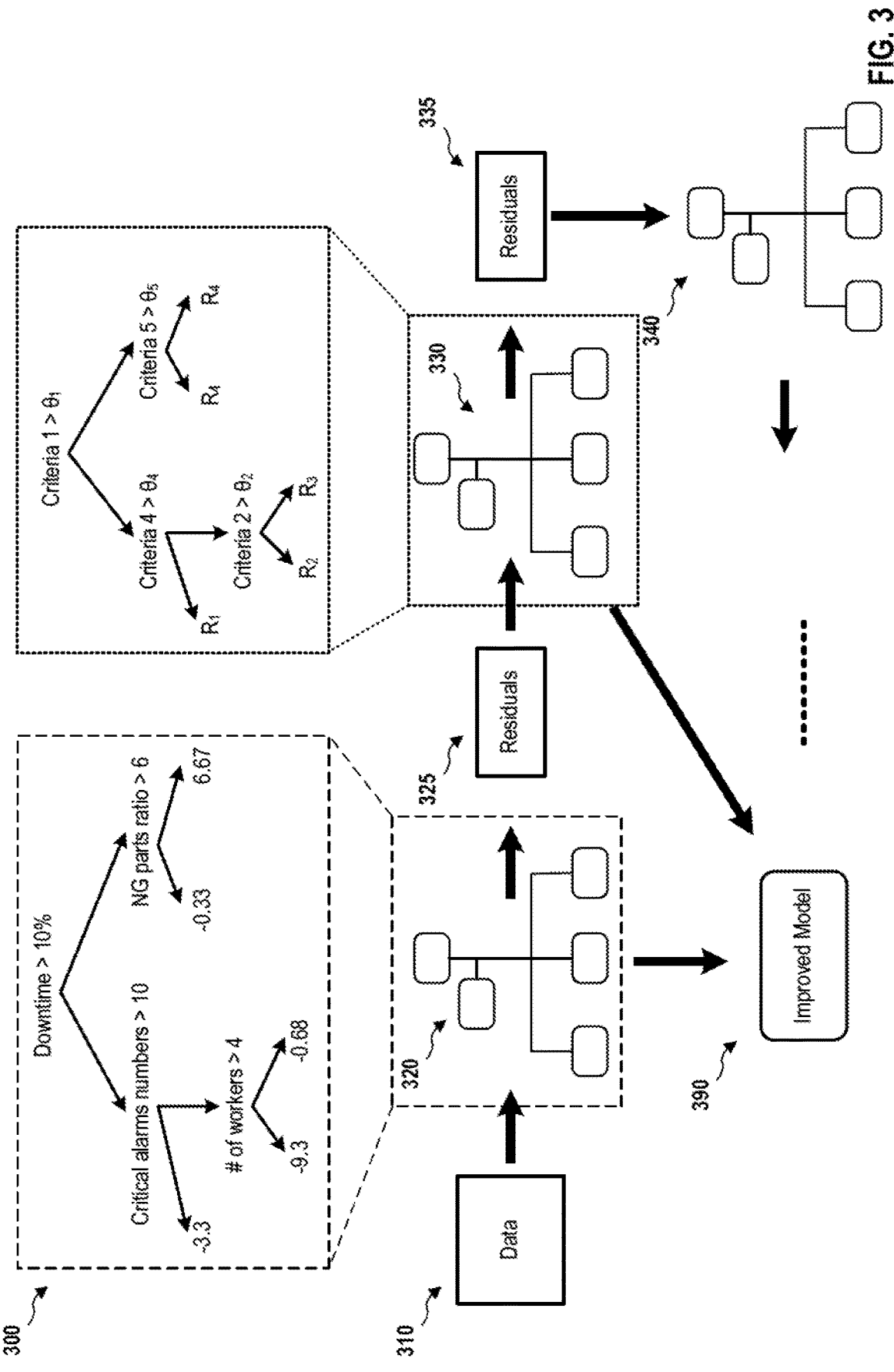
FIG. 3 is a diagram illustrating some aspects of the training of the gradient boost decision trees in accordance with some aspects of the disclosure.

Machine learning techniques are applied in numerous areas to solve different kinds of tasks. In some aspects, a gradient boost decision tree may be applied to predict the final (or overall) throughput at the beginning of the shift, considering the buffer volume, processing time, passed entering time, passed exit time, quality of passed parts, and other information over time. FIG. 2 is a flowchart 200 illustrating the training and use of gradient boost decision trees in accordance with some aspects of the disclosure. At 202, the training may include calculating an average throughput (e.g., production) per shift based on a set of historical shift data. This calculated average throughput, in some aspects, may be used as a baseline throughput. Calculating the average throughput per shift at 202, in some aspects, may include calculating average throughputs for multiple times throughout the shift or for sub-periods of time in the shift. FIG. 3 is a diagram 300 illustrating some aspects of the training of the gradient boost decision trees in accordance with some aspects of the disclosure.

At 204, the training may include calculating residuals (e.g., errors and/or differences) between a prediction and an actual end of shift production. In some aspects, the residual may be equal to the actual throughput for a shift minus the estimated and/or predicted throughput. The residuals may be calculated for multiple times throughout the shifts based on the average throughputs calculated for the corresponding times.

At 206, one or more decision trees may be built and/or constructed to predict a set of residuals (e.g., deviations from a calculated average throughput). For example, a set of data 310 (e.g., a training set of historical data) may be used to generate a first gradient boost decision tree 320 (to be included in an ensemble of gradient boost decision trees). Each leaf of the gradient boost decision tree may represent a criteria associated with a current state (e.g., whether a downtime associated with a set of one or more work stations or machines is greater than a threshold time, whether a number of critical alarms is greater than a threshold value, or some other measured and/or monitored criteria is above a threshold value). In some aspects, the one or more decision trees may be constructed based on a first configured parameter specifying a number of leaves on each decision tree, a second configured parameter specifying a total number of trees in an ensemble including the one or more decision trees, and a third configured parameter specifying a learning rate hyperparameter that scales the contribution of each decision tree. For example, if the learning rate hyperparameter is set to a low value, more trees may be included in the ensemble to fit the training set, while an overall variance will be lower. In some aspects, an optimized number of decision trees may be determined based on a staged prediction method that measures a validation error at each stage of training with different numbers of decision trees (i.e., with one decision tree, with two decision trees, etc.). In such aspects, the second configured parameter may be based on the optimized number of decision trees.

In some aspects, each leaf of the one or more decision trees may include a prediction for a residual value (e.g., a deviation from an average based on the state of the system associated with the leaf's criteria). In some aspects, different decisions trees constructed at 206 (e.g., in different iterations through the training steps 206 to 210) may use different criteria and/or different threshold values for predicting the set of residuals based on the training data set (e.g., historical data) as part of an ensemble of decision trees. For example, the criteria may include one or more of a planned volume, an entering and/or exiting time, a part status, a number of workers on the production line, the identities of workers on the production line, a worker status, a number of critical alarms, a status for each alarm, a downtime, a volume in a buffer, a time of day, an unexpected situation status, a part supplier, or information regarding a server.

At 208, the one or more decision trees constructed at each iteration of 206 may be used to predict and/or estimate a throughput. For example, the one or more decision trees may be used to construct predictions for throughput based on going through each decision tree in an ordered set of decision trees sequentially to produce an estimated and/or predicted throughput. The prediction for a particular decision tree may include taking an input that is either the average throughput or a predicted throughput from a previous decision tree in the ordered set of decision trees to produce an updated prediction based on criteria included in the particular decision tree. For example, beginning from an average throughput 'x' (e.g., the average throughput calculated at 202) a first tree (e.g., first decision tree 320) may produce a first set of updated predictions (e.g., $f_1(x)=x_1$) based on the criteria, threshold values, residuals, and a learning rate associated with the first decision tree for a corresponding set of training data sets (e.g., training data from historical shifts associated with known throughputs 'y'). Subsequent decision trees may produce further iterations of the updated prediction based on the prediction from a previous decision tree in the ordered set of decision trees (e.g., $f_n(x_{n-1})=x_n$, for n=2, . . . , N, where N is a current number of constructed decision trees) until a final prediction is produced by the $N^{th}$ (e.g., the last) decision tree. Each updated prediction may be calculated as updated_prediction=input_prediction+ learning_rate*residual (e.g., $f_n(x_{n-1})=x_n=x_{n-1}+\alpha*R$, where $\alpha$ is the learning rate and R is the residual based on the criteria and thresholds associated with the decision tree).

In some aspects, different decisions trees constructed at 206 (e.g., in different iterations through the training steps 206 to 210) may use different criteria and/or different threshold values for predicting the set of residuals based on the training data set (e.g., historical data) as part of an ensemble of decision trees. For example, a configured number of criteria may be used in each decision tree, but the specific criteria and threshold values associated with each criteria may be selected randomly or based on some selection criteria. The configured number of criteria may, for example, be four criteria that may be selected from a list of possible criteria including a planned volume, an entering and/or exiting time, a part status, a number of workers on the production line, the identities of workers on the production line, a worker status, a number of critical alarms, a status for each alarm, a downtime, a volume in a buffer, a time of day, an unexpected situation status, a part supplier, or information regarding a server.

For example, first decision tree 320 may be associated with a first criteria relating to downtime being greater than 10%, a second criteria relating to a number of alarms being greater than 10, a third criteria relating to a number of workers being greater than 4, and a fourth criteria relating to a no good (NG) parts ratio being greater than 6 (e.g., greater than 6% or using some other arbitrarily defined unit of measurement). A second decision tree 330 and a third decision tree 340 may be associated with different sets of criteria selected from a superset of criteria associated with collected data. As illustrated, the criteria may be selected in any order and may be associated with a particular threshold. In some aspects, the thresholds are selected based on the historical data in order to provide an optimized amount of additional information (e.g., selecting a threshold that best distinguishes between data associated with a first effect on the residual and a second effect on the residual). The different leaves of the decision trees may be associated with residuals calculated based on the testing data sets that meet the criteria in the decision tree.

At 210, new residuals may be computed based on the new predicted and/or estimated throughput. For example, the training may include calculating residuals (e.g., errors and/or differences) between the updated predictions and an actual end of shift production for each of a set of training data sets. Referring to FIG. 3, each decision tree (e.g., first decision tree 320 and second decision tree 330) may be associated with a calculated residual (e.g., residual 325 and residual 335, respectively). In some aspects, the residual may be equal to the actual throughput for a shift minus the estimated and/or predicted throughput. The residuals may be calculated for multiple times throughout the shifts based on the predicted and/or estimated throughputs calculated for the corresponding times.

At 212, a determination may be made as to whether a termination condition has been met. The termination condition may, in some aspects, be one or more of a threshold number of iterations of steps 206 to 210 or a (maximum) threshold residual for a series of decision trees (e.g., an ensemble of decision trees). When the termination condition has been determined to exist, the process may end and the ensemble of decision trees (e.g., an improved model 390 including the decision trees constructed at the multiple iterations of step 206) may be used to predict a throughput for the production at the end of a shift. For example, if the residuals of the ensemble of decision trees are below a threshold value (e.g., are accurate to within the threshold value), the training process may end and the ensemble of decision trees (e.g., an improved model 390) may be used to predict a throughput for the production at the end of a shift. However, if the residuals of the ensemble of decision trees are above the threshold value (e.g., are not accurate to within the threshold value), the training process may continue with at least one additional iteration of steps 206 to 210.

At 214, the ensemble of decision trees may be used to make a prediction for a current and/or upcoming shift. In some aspects, the training process illustrated in FIG. 2, may be used to build a model to estimate the total throughput at the end of each shift given all details collected regarding the production line and/or the production floor (e.g., the production line in diagram 100 of FIG. 1). For offline metrics, in some aspects, a Root Mean Squared Error (RMSE) is used to calculate the residuals, $$\sqrt{\sum_{k=1}^{n} \frac{(\text{predict} - y)^2}{n}},$$

where n is the total number of samples, "predict" is estimated wait time, and y is the actual wait time. In some aspects, for online metrics A/B testing (comparing a current model with an updated model) may be used along with monitoring RMSE, customer engagement, customer retention, etc.

Figure 4:
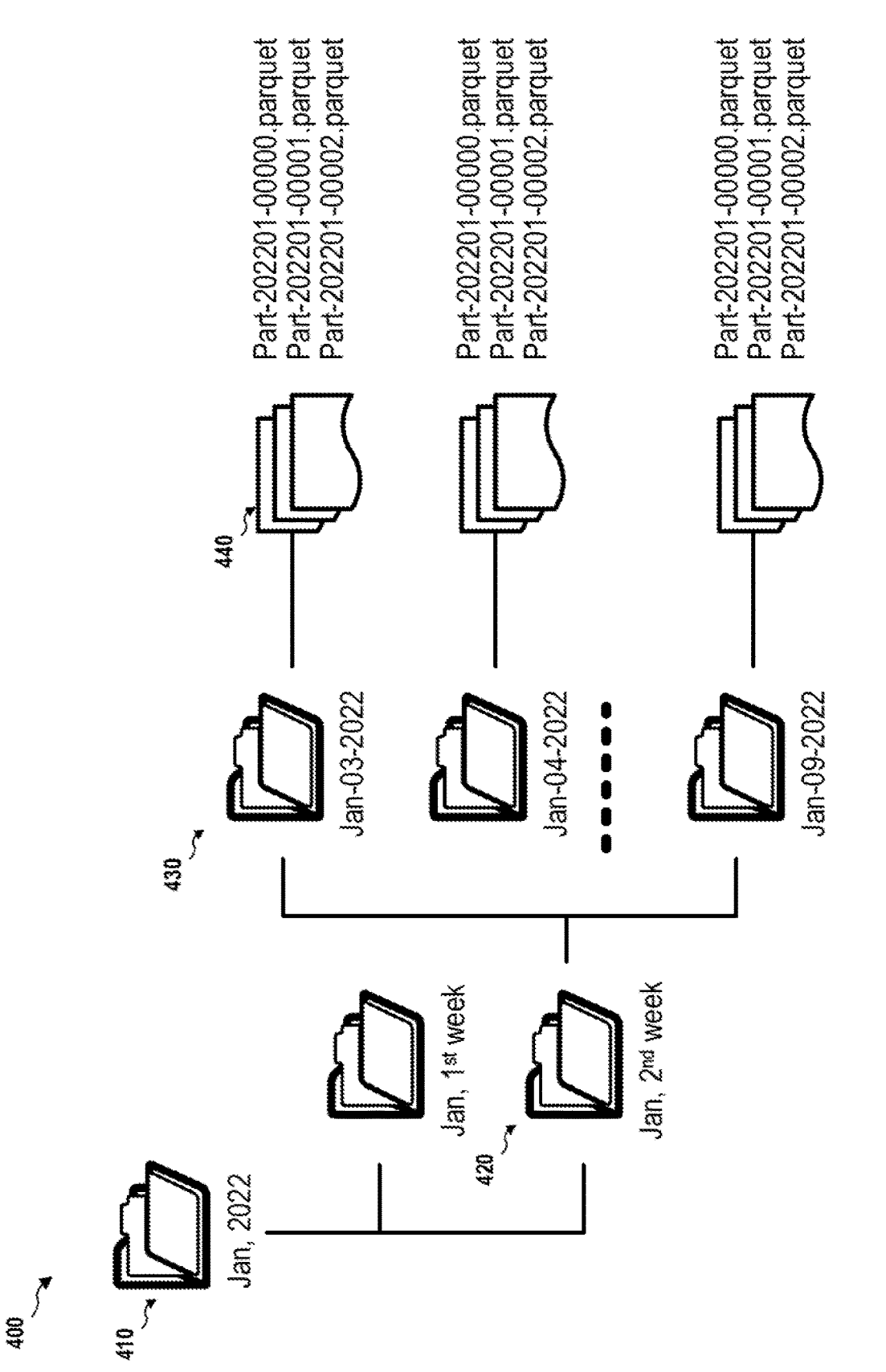
FIG. 4 is a diagram illustrating an example file structure in accordance with some aspects of the disclosure.

During training (e.g., the training described in relation to FIG. 2), large amounts of data may be processed. Accordingly, a high-throughput training pipeline may be beneficial or desired. To achieve a high throughput pipeline (e.g., increase data throughput and performance), collected data may be organized in highly efficient files, or file structures (e.g., parquet and or Optimized Row Columnar (ORC) files), suitable for big data storage. In some aspects, the highly accessible files (e.g., Parquet and/or ORC files) may be partitioned by time for efficiency to avoid scanning through the whole dataset. FIG. 4 is a diagram 400 illustrating an example file structure in accordance with some aspects of the disclosure. Diagram 400 illustrates a series of partitions going from coarse granularity 410 (month) to intermediate granularity 420 (week) to finer granularity 430 (day). Additional coarse, intermediate, or even finer granularity may be included in a data structure in some aspects. The lowest level of the partitions may include a set of files 440 for each of a set of parts and/or each of a set of times for each of a set of parts or components associated with the production line for which a predicted total production will be generated. For example, most commercial cloud or enterprise data services support Parquet and ORC as examples of highly accessible file systems. In comparison to other formats like csv, Parquet and/or ORC may speed up the query times to be 30× faster, save 99% of the cost, and reduce the data that is scanned by 99%.

In some aspects, the prediction may be updated (e.g., based on an updated system state) every few minutes. Plant operations, in some aspects, may be under a dynamic environment with a lot of factors such as alarms, downtimes, quality, experience workers, and/or other factors. Accordingly, it is important for the prediction to account for newly collected (e.g., dynamic) data. For example, during a shift, machine downtime conditions may get worse during certain periods and, without a retraining and/or reevaluation, the current model will consistently overestimate overall throughput. The features for which data may be collected, in some aspects, may include: a planned volume, entering and/or exiting time, a part status, a number of workers on the production line, the identities of workers on the production line, worker status, critical alarms, status for each alarm, downtime, volumes on buffer, time, unexpected situation status, part supplier, server information.

Figure 5:
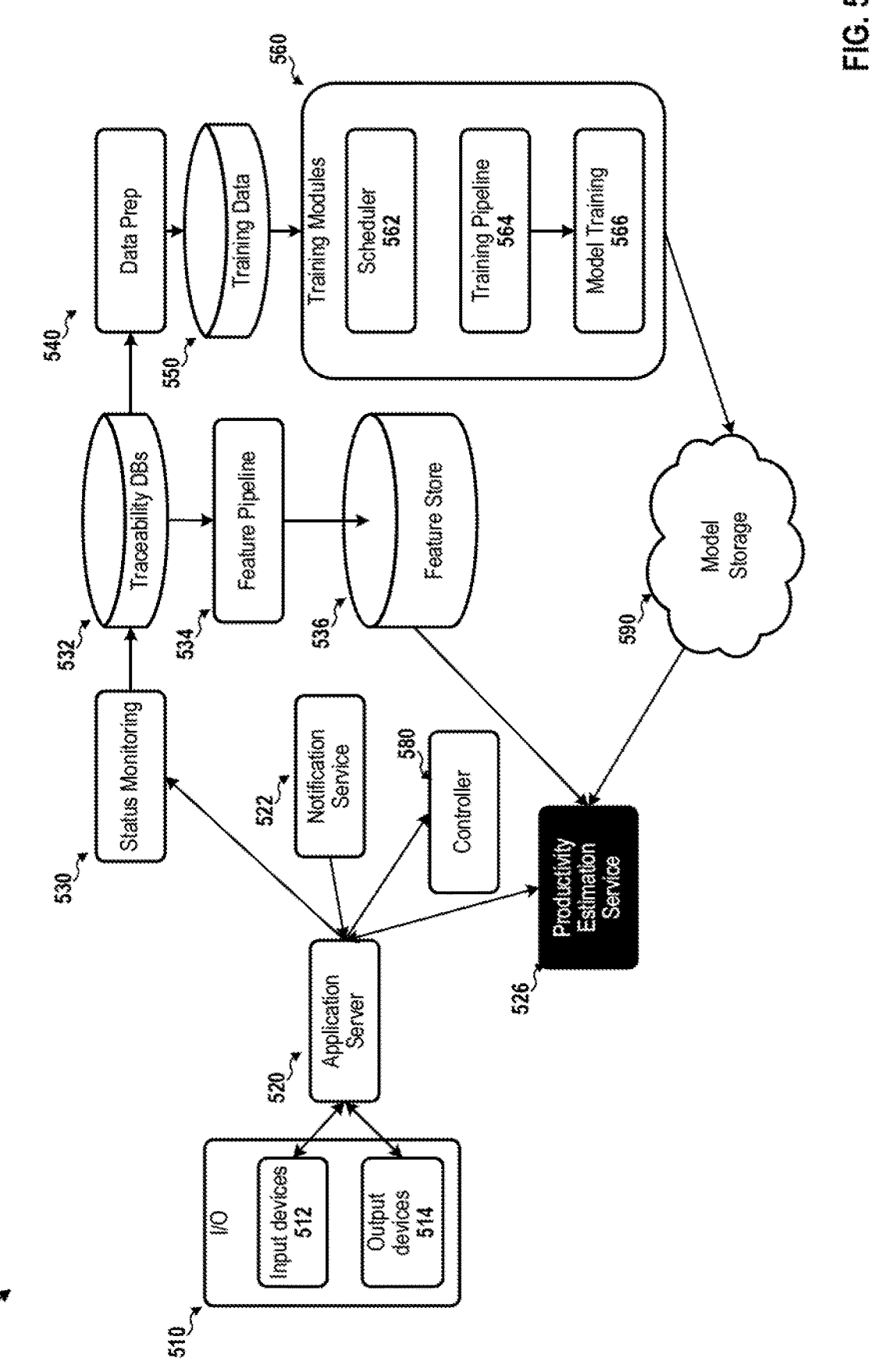
FIG. 5 is a diagram illustrating a system design for throughput estimation/prediction by the end of each shift in accordance with some aspects of the disclosure.

FIG. 5 is a diagram 500 illustrating a system design for throughput estimation/prediction by the end of each shift in accordance with some aspects of the disclosure. The system may include an input/output interface 510 including a set of input devices 512 (e.g., a keyboard, mouse, microphone, and so on) and a set of output devices 514 (e.g., a display, a speaker, and so on). The input/output interface 510 may be used to receive information from, and/or to provide information to, a user or system administrator. An application server 520 may serve as an intermediary between the analysis system and the system administrator and/or user. The production line may be associated with a set of sensors or other monitoring apparatus (vibration sensors, cameras, sensors incorporated into individual machines, and so on) that are associated with status monitoring 530 and/or the notification service 522. The application server 520, in some aspects, may be associated with the productivity estimation service 526 that provides the estimated throughput based on models stored in the model storage 590. In some aspects, the application server 520 may be associated with a controller 580 for controlling one or more components of the production line based on a prediction received from the productivity estimation service 526.

In some aspects, a feature storage pipeline may begin with the status monitoring 530 that provides raw data to a set of traceability databases 532. The traceability databases 532, in some aspects, may store the raw data based on a set of organizing principles such as based on a time of data collection, a machine associated with the data, a product associated with the data, or other relevant and extractable features. Traceability database 532, in some aspects, may store historical traceability data. The data stored in the traceability databases 532 may then be fed through (or processed by) a feature pipeline 534 that may read the data (e.g., from Kafka), transforms the data into a format for quick analysis, and aggregates near real-time statistics. The processed data, in some aspects, may then be stored in a feature store 536. The feature store 536, in some aspects, may provide fast lookup for low latency queries. The feature store 536, in some aspects, may be any suitable key-value storage with high availability.

In addition to the feature storage pipeline, some aspects, include a training data processing pipeline. Data preparation for the training data processing pipeline may include a process 540 to create training data from the data stored in the traceability database 532. The training data may be stored in a training data database 550. The training database may include one or more of an enterprise database or a cloud-based storage (for example, S3).

In some aspects, the system includes a set of training modules 560 for managing a training process. For example, a scheduler 562 may be responsible for coordinating an initial training of models and/or retraining the models over time. The models may be retrained based on a schedule or based on one or more triggers related to changes in a production floor or an accuracy of predictions of a current model. The scheduler 562 may trigger a training pipeline 564 that uses the training data in the training data database 550 to provide training data for a model training 566. The output of the model training 566 may be stored in a model storage 590 (e.g., a cloud-based storage or an enterprise database). The training pipeline 564 and model training 566 may be triggered periodically and/or on an event-triggered basis to update the model stored in the model storage 590.

Figure 6:
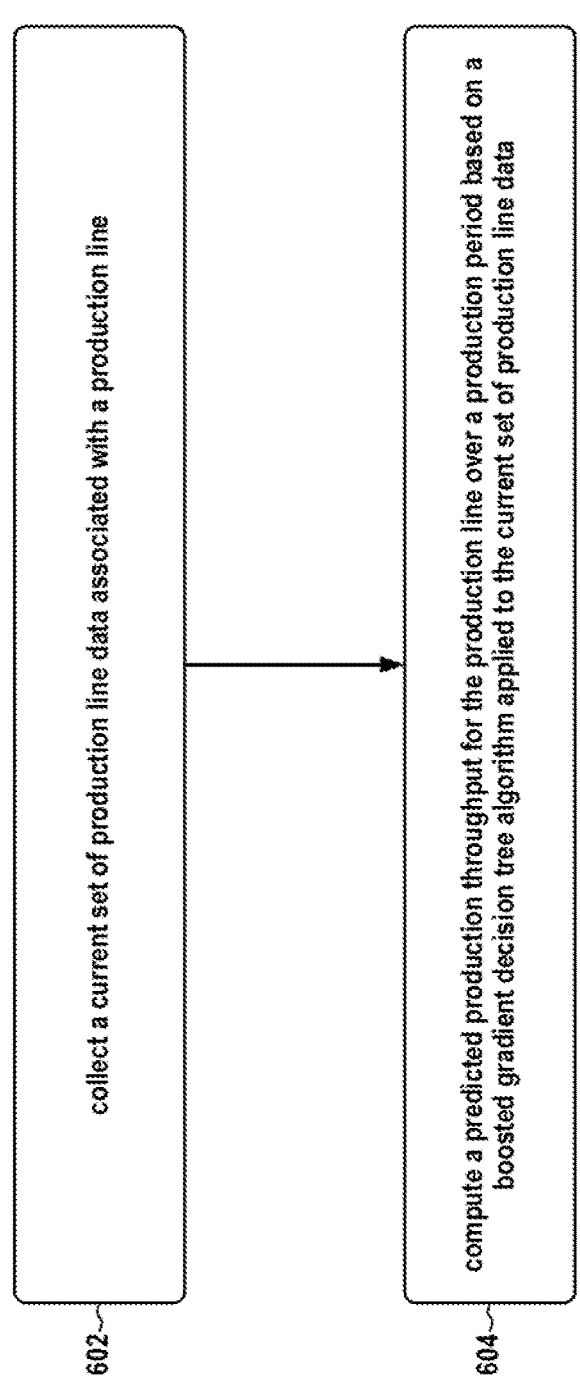
FIG. 6 is a flow diagram illustrating a method in accordance with some aspects of the disclosure.

FIG. 6 is a flow diagram 600 illustrating a method in accordance with some aspects of the disclosure. In some aspects, the method is performed by an analysis apparatus (e.g., computing device 805) that performs various training and prediction algorithms and/or applications based on collected production line data. At 602, the apparatus may collect a current set of production line data associated with a production line. For example, referring to FIGS. 4 and 5, the status monitoring 530 may include collecting data such as the data illustrated in diagram 400. In some aspects, the current set of production line data includes one or more of status updates or event notifications regarding components of the production line. The status updates, in some aspects, may include one or more of a pass-in time (e.g., a time at which a component enters a work station), a part-out time (e.g., a time at which the component exits the work station), a processing cycle time, or a part status (e.g., a good/no good status). In some aspects, the event notifications include one or more of an alarm, an unscheduled downtime for a component of the production line, or an unscheduled loss of a worker.

At 604, the apparatus may compute a predicted production throughput for the production line over a production period based on a boosted gradient decision tree algorithm applied to the current set of production line data. For example, referring to FIGS. 3 and 5, the productivity estimation service 526 may use the collected data stored in feature store 536 and the model stored in model storage 590 to compute a predicted production throughput for the production line based on a boosted gradient decision tree model (e.g., improved model 390). In some aspects, the production period is a shift and the predicted production throughput is a prediction of a total production associated with the shift.

The boosted gradient decision tree algorithm, in some aspects, may be trained on historical production line data as described above in relation to FIG. 2. The boosted gradient decision tree algorithm, in some aspects, may include a plurality of decision trees and each decision tree may be associated with a corresponding set of features of the collected set of production line data. In some aspects, at least two of the corresponding sets of features associated with at least two decision trees in the plurality of decision trees comprise at least one different feature.

The apparatus may collect a plurality of additional current sets of production line data during the production period. For example, referring to FIGS. 4 and 5, the status monitoring 530 may collect additional data such as the data illustrated in diagram 400. In some aspects, the collected data may be data related to a set of features that are associated with at least one decision tree associated with the boosted gradient decision tree algorithm.

The apparatus may perform a plurality of updating operations during the production period. For example, referring to FIG. 5, the scheduler 562 may initiate a plurality of training operations on a periodic or event-triggered basis. The updating operations, in some aspects, include a plurality of algorithm updating operations during the production period to update the boosted gradient decision tree algorithm for application to the plurality of additional current sets of production line data. The updating operation, in some aspects, may include adding additional boosted gradient decision trees based on the additional current sets of production line data. The updating operations, in some aspects, include a plurality of prediction-updating operations during the production period to update the predicted production throughput based on the boosted gradient decision tree algorithm applied to the plurality of additional current sets of production line data.

FIG. 7 is a flow diagram 700 illustrating a method in accordance with some aspects of the disclosure. In some aspects, the method is performed by an analysis apparatus (e.g., computing device 805) that performs various training and prediction algorithms and/or applications based on collected production line data. At 702, the apparatus may collect a current set of production line data associated with a production line. For example, referring to FIGS. 4 and 5, the status monitoring 530 may include collecting data such as the data illustrated in diagram 400. In some aspects, the current set of production line data includes one or more of status updates or event notifications regarding components of the production line. The status updates, in some aspects, may include one or more of a pass-in time (e.g., a time at which a component enters a work station), a part-out time (e.g., a time at which the component exits the work station), a processing cycle time, or a part status (e.g., a good/no good status, a retry percentage indicating a number of parts going through a process more than once). In some aspects, the event notifications include one or more of an alarm, an unscheduled downtime for a component of the production line, or an unscheduled loss of a worker.

At 704, the apparatus may compute a predicted production throughput for the production line over a production period based on a boosted gradient decision tree algorithm applied to the current set of production line data. For example, referring to FIGS. 3 and 5, the productivity estimation service 526 may use the collected data stored in feature store 536 and the model stored in model storage 590 to compute a predicted production throughput for the production line based on a boosted gradient decision tree model (e.g., improved model 390). In some aspects, the production period is a shift and the predicted production throughput is a prediction of a total production associated with the shift.

The boosted gradient decision tree algorithm, in some aspects, may be trained on historical production line data as described above in relation to FIG. 2. The boosted gradient decision tree algorithm, in some aspects, may include a plurality of decision trees and each decision tree may be associated with a corresponding set of features of the collected set of production line data. In some aspects, at least two of the corresponding sets of features associated with at least two decision trees in the plurality of decision trees comprise at least one different feature.

At 706, the apparatus may collect a plurality of additional current sets of production line data during the production period. For example, referring to FIGS. 4 and 5, the status monitoring 530 may collect additional data such as the data illustrated in diagram 400. In some aspects, the collected data may be data related to a set of features that are associated with at least one decision tree associated with the boosted gradient decision tree algorithm.

At 708, the apparatus may perform a plurality of updating operations during the production period. For example, referring to FIG. 5, the scheduler 562 may initiate a plurality of training operations on a periodic, or event-triggered, basis. The updating operations, in some aspects, include a plurality of algorithm updating operations during the production period to update the boosted gradient decision tree algorithm for application to the plurality of additional current sets of production line data. The updating operation, in some aspects, may include adding additional boosted gradient decision trees based on the additional current sets of production line data. The updating operations, in some aspects, include a plurality of prediction-updating operations during the production period to update the predicted production throughput based on the boosted gradient decision tree algorithm applied to the plurality of additional current sets of production line data.

Finally, at 710, the apparatus may trigger, based on at least one prediction, at least one operation to increase a predicted production throughput. For example, referring to FIG. 5, the application server 520 may communicate with controller 580 to adjust one or more components of a production line to increase productivity based on a prediction generated by model 590. The at least one operation may be based on a decision tree leaf associated with a negative effect on a productivity that can be remedied by the controller.

A machine learning method and apparatus are disclosed that takes as input a station status information, such as a pass-in time, a part-out time, a processing cycle time, a part status (OK/NG), and/or notifications of any event during the shift, to predict and/or estimate productivity and/or throughput for a shift at the beginning of the shift. The prediction and/or estimation may be adjusted over the course of the shift based on changing conditions. This solution will provide a forward solution to a customer to make adjustment and actions. In some aspects, the prediction may be used to automatically generate a set of operations for a controller to implement to improve the throughput prediction based on the decision trees of the model.

Figure 8:
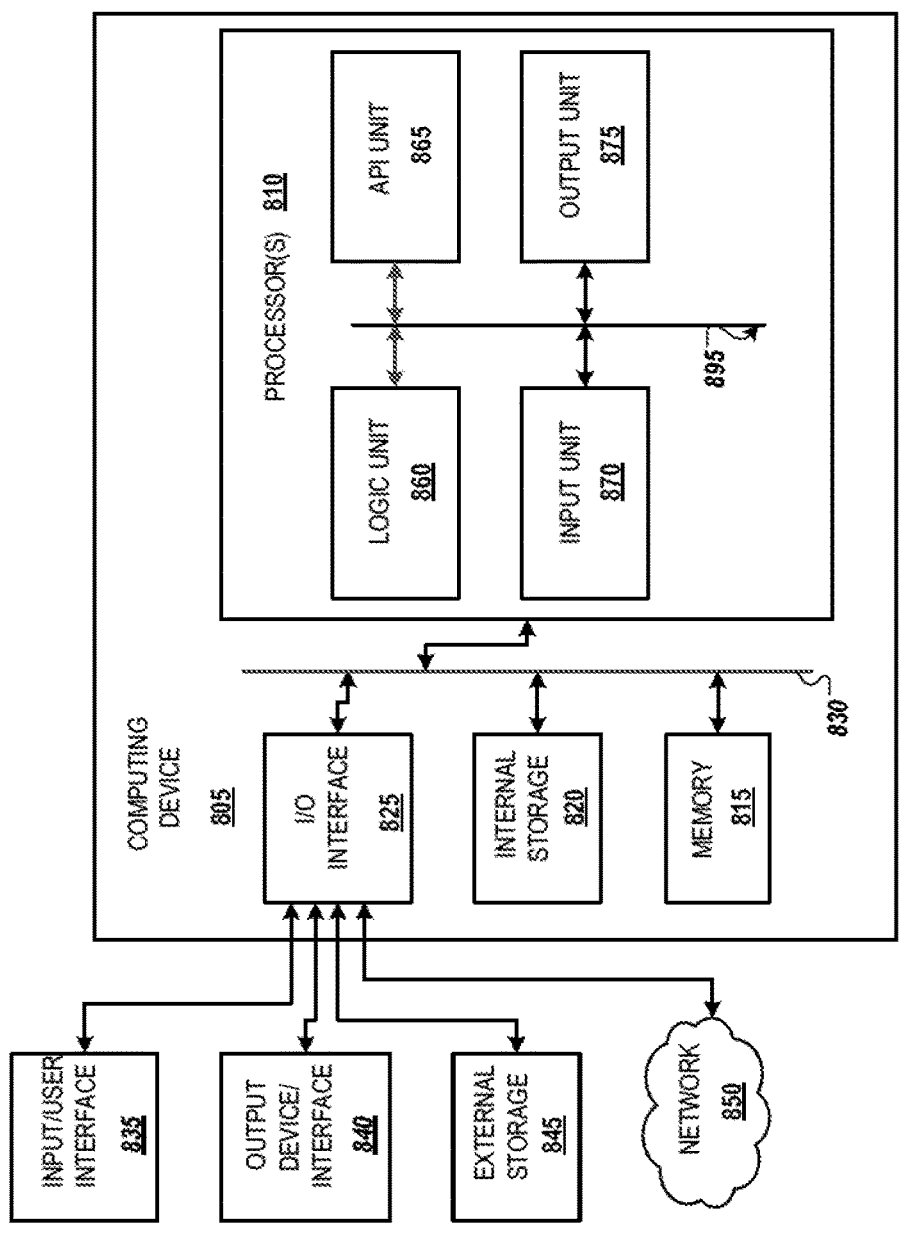
FIG. 8 illustrates an example computing environment with an example computer device suitable for use in some example implementations.

FIG. 8 illustrates an example computing environment with an example computer device suitable for use in some example implementations. Computer device 805 in computing environment 800 can include one or more processing units, cores, or processors 810, memory 815 (e.g., RAM, ROM, and/or the like), internal storage 820 (e.g., magnetic, optical, solid-state storage, and/or organic), and/or IO interface 825, any of which can be coupled on a communication mechanism or bus 830 for communicating information or embedded in the computer device 805. IO interface 825 is also configured to receive images from cameras or provide images to projectors or displays, depending on the desired implementation.

Computer device 805 can be communicatively coupled to input/user interface 835 and output device/interface 840. Either one or both of the input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 840 may include a display, television, monitor, printer, speaker, braille, or the like. In some example implementations, input/user interface 835 and output device/interface 840 can be embedded with or physically coupled to the computer device 805. In other example implementations, other computer devices may function as or provide the functions of input/user interface 835 and output device/interface 840 for a computer device 805.

Examples of computer device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 805 can be communicatively coupled (e.g., via IO interface 825) to external storage 845 and network 850 for communicating with any number of networked components, devices, and systems, including one or more computer devices of the same or different configuration. Computer device 805 or any connected computer device can be functioning as, providing services of, or referred to as a server, client, thin server, general machine, special-purpose machine, or another label.

IO interface 825 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computer device 805 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, and inter-unit communication mechanism 895 for the different units to communicate with each other, with the OS, and with other applications (not shown). The described units and elements can be varied in design, function, configuration, or implementation and are not limited to the descriptions provided. Processor(s) 810 can be in the form of hardware processors such as central processing units (CPUs) or in a combination of hardware and software units.

In some example implementations, when information or an execution instruction is received by API unit 865, it may be communicated to one or more other units (e.g., logic unit 860, input unit 870, output unit 875). In some instances, logic unit 860 may be configured to control the information flow among the units and direct the services provided by API unit 865, the input unit 870, the output unit 875, in some example implementations described above. For example, the flow of one or more processes or implementations may be controlled by logic unit 860 alone or in conjunction with API unit 865. The input unit 870 may be configured to obtain input for the calculations described in the example implementations, and the output unit 875 may be configured to provide an output based on the calculations described in example implementations.

Processor(s) 810 can be configured to collect a current set of production line data associated with a production line. The processor(s) 810 can be configured to compute a predicted production throughput for the production line over a production period based on a boosted gradient decision tree algorithm applied to the current set of production line data, where the boosted gradient decision tree algorithm is trained on historical production line data. The processor(s) 810 can also be configured to collect a plurality of additional current sets of production line data during the production period. The processor(s) 810 can also be configured to perform a plurality of algorithm updating operations during the production period to update the boosted gradient decision tree algorithm for application to the plurality of additional current sets of production line data. The processor(s) 810 can also be configured to perform a plurality of prediction-updating operations during the production period to update the predicted production throughput based on the boosted gradient decision tree algorithm applied to the plurality of additional current sets of production line data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software.

Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:

collecting a current set of production line data associated with a production line; and computing a predicted production throughput for the production line over a production period based on a boosted gradient decision tree algorithm applied to the current set of production line data, wherein the boosted gradient decision tree algorithm is trained on historical production line data, wherein the boosted gradient decision tree algorithm comprises a plurality of decision trees, each decision tree having a plurality of leaves, and wherein the decision tree leaf associated with the negative effect on productivity identifies a specific condition state of the production line that causes the negative effect and that is remediable by adjusting the one or more components of the production line via the controller; and triggering, based on the predicted production throughput, at least one operation to increase the predicted production throughput, wherein the at least one operation comprises communicating with a controller to adjust one or more components of the production line, and wherein the at least one operation is based on a decision tree leaf associated with a negative effect on productivity that can be remedied by the controller.

2. The method of claim 1, further comprising:

collecting a plurality of additional current sets of production line data during the production period; and performing a plurality of algorithm updating operations during the production period to update the boosted gradient decision tree algorithm for application to the plurality of additional current sets of production line data.

3. The method of claim 1 further comprising:

collecting a plurality of additional current sets of production line data during the production period; and performing a plurality of prediction-updating operations during the production period to update the predicted production throughput based on the boosted gradient decision tree algorithm applied to the plurality of additional current sets of production line data.

4. The method of claim 3, wherein the production period is a shift and the predicted production throughput is a prediction of a total production associated with the shift.

5. The method of claim 3, wherein the current set of production line data includes one or more of status updates or event notifications regarding components of the production line, wherein computing the predicted production throughput and performing the plurality of prediction-updating operations is further based on applying the boosted gradient decision tree algorithm to one or more of the status updates or the event notifications.

6. The method of claim 5, wherein the status updates comprise one or more of a pass-in time, a part-out time, a processing cycle time, or a part status.

7. The method of claim 5, wherein the event notifications comprise one or more of an alarm, an unscheduled downtime for a component of the production line, or an unscheduled loss of a worker.

8. The method of claim 1, wherein the boosted gradient decision tree algorithm comprises a plurality of decision trees and each decision tree is associated with a corresponding set of features of the collected set of production line data associated with the production line.

9. The method of claim 8, wherein at least two of the corresponding sets of features associated with at least two decision trees in the plurality of decision trees comprise at least one different feature.

10. An apparatus comprising:
a memory; and
at least one processor coupled to the memory and, based at least in part on stored information stored in the memory, the at least one processor is configured to:
collect a current set of production line data associated with a production line; and
compute a predicted production throughput for the production line over a production period based on a boosted gradient decision tree algorithm applied to the current set of production line data, wherein the boosted gradient decision tree algorithm is trained on historical production line data, wherein the boosted gradient decision tree algorithm comprises a plurality of decision trees, each decision tree having a plurality of leaves, and wherein the decision tree leaf associated with the negative effect on productivity identifies a specific condition state of the production line that causes the negative effect and that is remediable by adjusting the one or more components of the production line via the controller; and
trigger, based on the predicted production throughput, at least one operation to increase the predicted production throughput, wherein the at least one operation comprises communicating with a controller to adjust one or more components of the production line, and wherein the at least one operation is based on a decision tree leaf associated with a negative effect on productivity that can be remedied by the controller.

11. The apparatus of claim 10, wherein the at least one processor is further configured to:
collect a plurality of additional current sets of production line data during the production period; and
perform a plurality of algorithm updating operations during the production period to update the boosted gradient decision tree algorithm for application to the plurality of additional current sets of production line data.

12. The apparatus of claim 10, wherein the at least one processor is further configured to:
collect a plurality of additional current sets of production line data during the production period; and
perform a plurality of prediction-updating operations during the production period to update the predicted production throughput based on the boosted gradient decision tree algorithm applied to the plurality of additional current sets of production line data.

13. The apparatus of claim 12, wherein the production period is a shift and the predicted production throughput is a prediction of a total production associated with the shift.

14. The apparatus of claim 12, wherein the current set of production line data includes one or more of status updates or event notifications regarding components of the production line, wherein computing the predicted production throughput and performing the plurality of prediction-updating operations is further based on applying the boosted gradient decision tree algorithm to one or more of the status updates or the event notifications.

15. The apparatus of claim 14, wherein the status updates comprise one or more of a pass-in time, a part-out time, a processing cycle time, or a part status.

16. The apparatus of claim 14, wherein the event notifications comprise one or more of an alarm, an unscheduled downtime for a component of the production line, or an unscheduled loss of a worker.

17. The apparatus of claim 10, wherein the boosted gradient decision tree algorithm comprises a plurality of decision trees and each decision tree is associated with a corresponding set of features of the collected set of production line data associated with the production line.

18. The apparatus of claim 17, wherein at least two of the corresponding sets of features associated with at least two decision trees in the plurality of decision trees comprise at least one different feature.

19. A non-transitory computer-readable medium storing computer executable code, the computer executable code when executed by a processor causes the processor to:
collect a current set of production line data associated with a production line; and
compute a predicted production throughput for the production line over a production period based on a boosted gradient decision tree algorithm applied to the current set of production line data, wherein the boosted gradient decision tree algorithm is trained on historical production line data, wherein the boosted gradient decision tree algorithm comprises a plurality of decision trees, each decision tree having a plurality of leaves, and wherein the decision tree leaf associated with the negative effect on productivity identifies a specific condition state of the production line that causes the negative effect and that is remediable by adjusting the one or more components of the production line via the controller; and
trigger, based on the predicted production throughput, at least one operation to increase the predicted production throughput, wherein the at least one operation comprises communicating with a controller to adjust one or more components of the production line, and wherein the at least one operation is based on a decision tree leaf associated with a negative effect on productivity that can be remedied by the controller.

20. The computer-readable medium of claim 19, wherein the computer executable code when executed by the processor further causes the processor to:
collect a plurality of additional current sets of production line data during the production period; and
perform a plurality of algorithm updating operations during the production period to update the boosted gradient decision tree algorithm for application to the plurality of additional current sets of production line data.

* * * * *